UNITED STATES PATENT OFFICE.

CHARLES H. FULTON, OF CLEVELAND, OHIO, ASSIGNOR TO DAVID B. JONES, OF CHICAGO, ILLINOIS.

RECOVERY OF ZINC.

1,193,680.   Specification of Letters Patent.   Patented Aug. 8, 1916.

No Drawing. Substitute application Serial No. 878,973, filed December 24, 1914. This application filed December 23, 1915. Serial No. 68,383.

*To all whom it may concern:*

Be it known that I, CHARLES H. FULTON, a citizen of the United States, residing at Cleveland, in the county of Cuyahoga and State of Ohio, have invented certain new and useful Improvements in the Recovery of Zinc, of which the following is a description.

The primary object of my invention is the recovery of an increased percentage of the zinc content of the ore, either in the form of spelter or in the form of zinc oxid, although other advantages flow from my invention, as will be hereinafter pointed out.

I attain the object and advantages of my invention by mixing the ore and the reducing agent and a binding material in certain proportions, forming the mixture into briquets under a high pressure, subjecting the briquets to a preliminary heating and drying operation under certain prescribed conditions, and subsequently subjecting them to treatment in a distillation furnace for the recovery of their zinc content either in the form of spelter or in the form of zinc oxid as may be desired. The briquets so formed and treated are of novel composition and character, and remain intact and preserve both their form and volume throughout the distilling operation to which they are subjected. This latter characteristic of the briquets is a highly important and advantageous one and I believe entirely novel.

In carrying out my invention the zinc bearing ore is ground and calcined in the usual way, and then thoroughly mixed with pulverized coke and a suitable binding material in the proportions hereinafter specified. The binding material which I preferably employ is pitch, although both pitch and tar may be used, or a suitable carbonaceous substitute for them. Where pitch is employed as the binding agent it may be what is known as hard coal tar pitch, which softens at about 100° C. and melts at about 140° C. This pitch, being brittle at low temperature, is ground fine and mixed with the ore and coke until a very uniform mixture of the three is obtained. This mixing operation may be readily carried out in a revolving drum mixer. The mixture is then heated to the melting point of the pitch, which melts and softens in place and thoroughly coats each particle of ore and coke. This heating of the mixture can be carried out in a pan mixer provided with stirring arms and heated by means of a jacket through which superheated steam passes, or other means for the purpose may be employed. From the heater the hot mixture passes to the briquet presses, the molds of which are preferably somewhat warm. If a portion of the pitch is replaced with tar the liquid tar will be mixed with the ore and coke and pitch, and the mixer in which the mixture is effected need not be heated.

I form the above described mixture into briquets of any desired shape, but preferably either spherical or cylindrical, in suitable molds, in which they are subjected to a high pressure, preferably upward of 500 pounds to the square inch, so as to solidify the mixture and form it into as firm and compact a mass as possible. If the press molds have been warmed to a temperature of 50° to 60° C. the briquets will not stick to the molds. I prefer to submit the briquets to a pressure of between 500 pounds and 1000 pounds per square inch. A greater pressure than the latter will cause the briquet to swell and crack during the subsequent drying and distilling operations.

The next step in the operation is the drying of the briquets. This drying involves the driving off of the volatile matter in the carbonaceous binding material by gradually raising the temperature of the briquets until the binding material is converted into coke, so that the briquets are free from any volatile hydrocarbons which would tend to dilute the zinc vapors resulting from the distillation. I have found that the pitch which I preferably employ as the binding material becomes quite thoroughly coked at about 400° C., the coke residue amounting to about 60% of the original weight of the pitch. As the amount of pitch used is only 12% to 15% of the weight of the ore plus that of the original coke, as hereinafter explained, the amount of volatile matter to be driven off is comparatively small. The preheating or drying temperature can be raised considerably above 400° C. without harm, as no zinc is distilled below approximately 900° C. except in the case of very pure ores. If a very rapid distillation is desired in the retorts the drying can be done at the higher temperatures with advantage.

To secure the most advantageous results the above described preheating and drying of the briquets must be done under strictly non-oxidizing conditions, for if oxygen is permitted to reach the briquets during such operation the coke will oxidize on the surface of the briquets and cause the outside of the briquet to assume a loose and friable condition, with resulting disintegration of the surface of the briquet. The briquets may be protected from the action of oxygen during the drying operation by embedding them in finely crushed coke, by which they are completely covered and inclosed; or the same result may be accomplished by drying them in a heating chamber from which oxygen is excluded. In the latter event the briquets should be suitably supported during the drying operation, to prevent them from breaking down or collapsing, which may be accomplished by placing them in cups or seats of fire-clay or other suitable material, such cups or seats being semi-spherical in shape for spherical briquets and semi-cylindrical in shape for cylindrical briquets. If the briquets are embedded in powdered coke during the drying operation the coke will serve to properly support them and no additional means need be employed.

The dried briquet, while still warm, may be advantageously dipped for a very brief time in molten pitch. This will form a coating of pitch in the skin of the briquet and serve to give the briquets additional surface strength after final distillation and decrease the abrasion and wear of them during their subsequent handling. The amount of binder thus absorbed by the briquet may be varied by regulating the temperature of the molten pitch and of the briquet and the time of immersion. If the temperature of both the pitch and briquet is high the molten pitch will penetrate quite deeply, while if the briquet is comparatively cool the coating will be correspondingly lighter for any given period of immersion. With briquets three inches in diameter I have varied the amount of binder absorbed by the briquet from 2.5% to 6% of the weight of the dried briquet. This dipping operation is not essential to the successful practice of my invention, but is advantageous in the treatment of difficult ores.

When the pitch coating (if employed) has dried, the briquets are ready for the distillation furnace. In this condition the structure of the briquet is that of a large number of ore particles embedded in a coke matrix, this coke matrix being made up of the original coke and the coke left by the distillation of the pitch binder. These briquets are, I believe, of novel composition and character, and embody very great advantages in respect to the recovery of the zinc and other valuable contents of the ore contained in them, as well as in other respects hereinafter pointed out. Their most important and valuable characteristic is that they will maintain both their form and volume during the subsequent distilling operation to which they are subjected for the recovery of their zinc content, either in the form of spelter or zinc oxid. This characteristic is of great importance and value, not only for the recovery of their zinc content by distillation in the spelter or oxid furnace, but for the protection of the retorts of the furnace during such distilling operation, and for the subsequent handling and treatment of the residual briquets. This novel and valuable characteristic of the briquets is due to the character and proportions of the reducing and binding agents employed and to the method of forming the briquets which has been described. With respect to the character of the reducing agent, coke, it differs from both anthracite and bituminous coal, commonly employed as reducing agents, first, in that it contains no volatile matter to be driven off during the distilling operation, and, second and consequently, its particles have assumed what may be considered their final form when they are originally incorporated in the briquet, whereas both anthracite and bituminous coal undergo distillation and their particles consequently change their form. This characteristic of coal as a reducing agent is not only objectionable in that the particles of the reducing agent undergo a change of form during the distilling operation, but is also objectionable in that the gases and hydrocarbon vapors driven off from such a reducing agent during the process of distillation operate to dilute the zinc vapors driven off during the earlier stages of the distilling operation, thereby lowering the vapor pressure of the zinc vapors in the condensers of the retorts and causing a loss in the zinc which escapes condensation. This gives a low recovery of zinc. The use of coke as the reducing agent gives rise to no gases except the carbon monoxid, formed by the union of its carbon with the oxygen of the zinc oxid, which union constitutes the reducing reaction. The use of coke, as the reducing agent, therefore reduces to a minimum the dilution of the zinc vapors by other gases and vapors during the distilling operation and correspondingly increases the recovery of zinc, in addition to which, as before explained, the coke presents a stable and unchangeable material about which the body of the briquet is formed and insures the continued stability of the briquet during and after the final distillation operation.

With respect to the proportions of coke and ore to be employed, which I have not so far explained, these proportions vary with different ores, owing to the fact that different ores vary widely in the nature and amount of the residue which they leave after the distillation of their zinc content. This variation of the residue left from the ore, both in respect to its amount and character, has a great influence on the stability of the briquet during the ensuing distillation. The principle which covers the proper proportions of ore and coke for the production of a stable briquet is that there must be left, after distillation, a sufficient mass of porous material to maintain the original volume of the briquet, and I have determined by experiment that the amount of coke to be added to any given ore to form such a briquet is an amount that will furnish the necessary carbon for the reduction of all of the metal oxids in the ore, plus such an additional amount that the weight of the briquet, after distillation, will not be less than from 40% to 50% of the weight of the briquet before distillation. For instance, some very rich or pure zinc ores leave a residue of only about 12% of the weight of the ore after distillation, this residue consisting largely of silica and iron oxid. In recovering zinc from such ore by the method of my present invention, therefore, it is necessary to add to the ore an amount of coke (about 15%) theoretically sufficient to reduce the ore, and an additional amount of coke sufficient to give the residual briquet a weight not less than 40% to 50% of the original briquet. This additional amount of coke so required I have found to be about 55%, making a total of 70% of the weight of the ore; in addition to which there is employed a suitable amount of binding material, such as pitch. Other zinc ores which I have tested, in developing my invention, leave residues after distillation varying from 15.8% to 36.7%. Thus, three ores from Wisconsin and Missouri were found to leave residues of 15.8%, 18.3% and 20.9%, respectively, the residues consisting largely of iron oxid and some silicates. One western zinc ore which I have reduced leaves a residue of 27.9%. The ore known as willemite, from Franklin furnace, New Jersey, leaves a residue of 36.7%, consisting chiefly of silicates. I have ascertained that the amounts of coke necessary to be employed with the various ores above referred to, for the production of satisfactory briquets, are, respectively, as follows: for the very rich or pure zinc ores 70%; for the western ore 60%; for willemite 30%. To each 100 parts by weight of ore will be added the amounts of coke named, plus a suitable amount of binding material.

With respect to the amount of pitch or other carbonaceous binding material to be employed, in proportion to the ore and coke, the function of the binder is two-fold. First, in the forming of the briquet it unites the particles of ore and coke by its adhesive action, and, second, during the drying of the briquet it permanently unites the particles of ore and coke by means of the coked residue which it leaves after the preliminary drying or coking operation. The amount of binder required is such that the particles of ore and coke may be completely surrounded by a film of binder, which unites them together into a coherent mass. This film of binder should have an appreciable thickness. It is apparent that the binder must cover a certain amount of surface and hence the smaller the ore and coke particles are the greater will be the surface to be covered by the binder. The amount of binder required therefore varies with the degree of fineness of the ore and coke. By extensive experiment I have found that satisfactory briquets are produced if the amount of binder is between 12% and 15% of the weight of the ore plus the weight of the coke. This refers to moderately fine ore, such, for instance, as will pass through a 65 mesh screen, and to moderately fine coke, such, for instance, as will pass through a 10 mesh screen. A greater amount of binder than that above mentioned offers no advantage, and may be detrimental in that the excess will be squeezed out of the briquet during the pressing of the latter in the molds. A smaller amount of binder than the minimum percentage named does not, in most cases, produce a satisfactory briquet.

With respect to the fineness to which the ore and coke shall be ground, I have ascertained by experiment that the size of the ore particles, within certain limits has comparatively little influence on the final strength of the briquet, and likewise little influence on the rate of distillation of the zinc from the briquet and the completeness with which the zinc is extracted from the briquet. Usually the ore furnished to the zinc smelter is comparatively fine, and sometimes very fine, and I have not experimented with ore coarser than a grade that will pass freely through an 8 mesh screen. The ores as usually furnished also contain an assortment of particles of widely differing sizes, ranging from particles approximating $\frac{1}{10}$ of an inch in major dimension down to an impalpable powder. This mixture of different sized particles is of advantage in making briquets, although very good briquets can be made from very fine ore.

While the size of the ore particles, within certain limits, has little influence upon the strength and stability of the briquet, I have ascertained that the size of the coke particles has a very decided influence upon them, very fine coke giving a much stronger briquet than moderately fine or comparatively coarse coke. For instance, a cylindrical briquet of ore three inches in diameter, made up with 20 mesh coke (meaning thereby coke all of which passes through a 20 mesh screen) withstood only 15 pounds pressure, whereas one made up with 48 mesh coke withstood 200 pounds pressure, and one made up with 100 mesh coke withstood 610 pounds pressure, these tests having been made with the residual briquets left after the distillation of their zinc content. When it is desired to produce especially strong briquets, therefore, fine coke should be used.

Where the zinc content of the ore is to be recovered in the form of spelter the briquets are introduced into the retorts of a spelter furnace and subjected to the usual distilling operation, the zinc being driven off in the form of vapor and collected in the form of spelter in the condensers of the retorts. Where, on the other hand, it is desired to recover the zinc content of the briquets in the form of zinc oxid, the briquets will be introduced into the retorts of a zinc-oxid furnace and their zinc content recovered in the form of zinc-oxid by the well-known French method, the zinc vapors driven off from the briquets being subjected to an oxidizing current or supply of air by which the zinc content of the vapors is converted into zinc oxid, which is collected in the usual manner.

I am aware that it is not novel, in the art and practice of recovering zinc from zinc bearing ore, to mix the pulverized ore and a reducing agent with a binding material, and to form the mixture into briquets under pressure, preparatory to subjecting the ore to distillation in the retorts of a distillation furnace. The novelty of my invention in this respect resides in the composition and the character of the briquets produced in the carrying out of my invention, and particularly in their characteristic of remaining intact and preserving their form and volume when subjected to the very high temperature of the distillation furnace.

I have explained the purpose and object of using coke, instead of some other material, as the reducing agent, and of employing it in such proportions relatively to the ore with which it is mixed as to form a briquet of such character that there will remain, after distillation, a sufficient mass of porous material to maintain the original volume of the briquet; and also the purpose and advantage of employing pitch or a similar carbonaceous material as the binding agent, and of subjecting the briqueted mixture to a preheating or drying operation by which the binding material will be destructively distilled and coked and its volatile contents driven off, leaving the briquet composed of the original particles of ore and coke surrounded and firmly bound together by the coke residue of the binding material, such briquet not only being of sufficient strength and stability to maintain its form and volume when subjected to the high temperature of the distillation furnace, but containing a minimum content of foreign volatile matter to be driven off during the distilling operation and mingled with the zinc vapors to the detriment of the complete recovery of zinc from the latter. The carrying of the ore particles in the coke matrix of the briquet, whose form and volume are preserved during the distilling operation, prevents the ore residue from reaching the retort walls and injuring the latter. One of the chief difficulties in the distillation of zinc ore mixtures in the retorts of a distillation furnace, either in the form of a loose mixture or in the form of briquets which break down and disintegrate during the distilling operation, is that the ore residue, such as iron oxids and sulfids, reaches and attacks the fire-clay retorts in spots and eats its way through them, destroying or "butchering" the retorts. Iron sulfid is particularly harmful, since it becomes thinly molten at the temperature used in the distilling operation and finds its way through the interstices of the loose charge to the bottom of the retort, and when the retort is opened to the atmosphere this iron sulfid oxidizes to iron oxid, which unites with the wall of the retort and causes a puncture of the latter. By means of my novel briquets, in which the ore particles are embedded and carried in a coke matrix, which remains intact and maintains its form and volume throughout the distilling operation, the ore residue is largely prevented from reaching and attacking the walls of the retort and the consequent injury to the latter is thereby reduced to a minimum.

My invention is of particular value in the commercial treatment of low grade ores and of the ores commonly known as "complex" ores. With respect to the former, it not only prevents or reduces to a minimum the damage to the retorts by the ore residue, which is a much more serious matter in the treatment of low grade than high grade ores, but it also prevents the ore particles from agglomerating and sintering together into larger pieces which cannot be in intimate contact with the reducing agent, with resulting imperfect distillation of the zinc content of these agglomerations and a low recovery of zinc from the charge as a whole.

With respect to the treatment of the so-called "complex" ores by my invention, these ores consist of an aggregate of lead minerals, zinc minerals, silver minerals, and in some cases copper minerals, associated with the non-valuable gangue minerals. These ores may also contain some gold. The copper smelter cannot successfully treat ores that contain lead, nor ores that contain more than a small (about 10%) amount of zinc, and even this zinc is not recovered by the copper smelter. The lead smelter, on the other hand, can treat ores that contain both copper and lead and a small amount of zinc, but the zinc is not recovered. The zinc smelter desires, in the ordinary practice, nearly pure zinc ores, and while ores that contain some lead and perhaps copper may be treated, the working of ores that contain considerable percentages of these metals give rise to great metallurgical difficulties, particularly in the destruction of retorts. My invention enables the zinc to be recovered from such complex ores by distillation in the usual way, without destruction of the retorts and without undue cost, with a marked increase in the percentage of zinc recovered; and it also enables the lead and copper residue, containing the gold and silver, to be subsequently smelted in lead blast furnaces and their valuable contents recovered. If the ore mixture be introduced into the retorts of the distillation furnace in the form of a loose mixture, or in the form of briquets which break down and disintegrate during the distilling operation, not only is the percentage of zinc recovery reduced and the retorts subjected to the destructive action of the ore residue, but the entire residue left in the retort after the distilling operation is in very poor condition for further treatment. By the employment of my invention the retort residue, in the case of ores that contain lead or copper or both, and precious metals, is left in the best possible form and condition to be subsequently smelted in a lead blast furnace.

In addition to the foregoing more important advantages of my invention, there are a number of minor ones. For instance, my novel briquets are of such strong and coherent character, both before and after distillation, as to enable them to be readily handled without breakage or damage by ordinary commercial methods and without the exercise of any particular care. Again, the preservation of the briquets intact and without change of form or volume during the distilling operation enables the ore residue remaining after distillation to be more quickly and readily removed from the retorts, and the latter cleaned, than is possible where the ore mixture is introduced into the retorts either in the form of a loose mixture or in briquets which break down and disintegrate during the distilling operation. Again the high percentage of coke employed with the ore in the production of my novel briquets, for the purpose of maintaining the integrity and volume of the briquet during the distilling operation, is not a commercial disadvantage, because it permits the employment of a cheaper grade of coke than would be required were not such a large excess of coke over the amount required for the mere reduction of the ore employed.

This application is a substitute for my prior application, Serial No. 878,973, filed December 24, 1914.

I claim:

1. The herein described method of recovering zinc from zinc-bearing ore, consisting of grinding and calcining the ore, mixing it with pulverized coke in quantity more than sufficient for the reduction of metallic oxids in the ore and with a carbonaceous binding material, forming said mixture into briquets under pressure, heating said briquets to a temperature sufficiently high to destructively distil and coke the carbonaceous binding material, but not high enough to volatilize the zinc content of the ore, to form a briquet capable of withstanding without disintegration zinc-distillation temperatures; and subsequently subjecting the briquets to the usual zinc-distillation process to recover the zinc.

2. The herein described method of recovering zinc from zinc-bearing ore, consisting in grinding and calcining the ore, mixing it with pulverized coke in quantity more than sufficient for the reduction of metallic oxids in the ore and with a carbonaceous binding material, forming said mixture into briquets under pressure, heating said briquets while supported against collapse to a temperature sufficiently high to destructively distil and coke the carbonaceous binding material, but not high enough to volatilize the zinc content of the ore, to form a briquet capable of withstanding without disintegration zinc-distillation temperatures; and subsequently subjecting the briquets to the usual zinc-distillation process to recover the zinc.

3. The herein described method of recovering zinc from zinc-bearing ore, consisting in grinding and calcining the ore, mixing it with pulverized coke in quantity more than sufficient for the reduction of metallic oxids in the ore and with pitch and tar, forming said mixture into briquets under pressure, heating said briquets while supported against collapse to a temperature sufficiently high to destructively distil and coke the pitch and tar, but not high enough to volatilize the zinc-content of the ore, to form a briquet capable of withstanding without disintegration zinc-distillation temperatures; and subsequently subjecting the briquets to the usual zinc-distillation process to recover the zinc.

4. The herein described method of recovering zinc from zinc-bearing ore, consisting in grinding and calcining the ore, mixing it with pulverized coke and a carbonaceous binder such as pitch or tar, the quantity of coke being such as to furnish the necessary carbon for reduction of all the metallic oxides in the ore, plus such an additional amount of coke that the weight of the briquet, after distillation, will not be less than forty to fifty per cent. of the weight of the briquet before distillation; briqueting the mixture under pressure in molds, heating the briquets to a temperature high enough to destructively distil and coke the carbonaceous binder without volatilizing the zinc-content of the ore; and subsequently subjecting said briquets to the usual zinc-distillation process to recover the zinc.

5. The herein described method of recovering zinc from zinc-bearing ore, consisting in grinding and calcining the ore, mixing it with pulverized coke and a carbonaceous binder such as pitch or tar, the quantity of coke being such as to furnish the necessary carbon for reduction of all the metallic oxids in the ore, plus such an additional amount of coke that the weight of the briquet, after distillation, will not be less than forty to fifty per cent. of the weight of the briquet before distillation, and the quantity of binder being from twelve to fifteen per cent. of the combined weight of the ore and the coke, briqueting the mixture under pressure in molds, heating the briquets to a temperature high enough to destructively distil and coke the carbonaceous binder without volatilizing the zinc-content of the ore, supporting the briquets against collapse or breaking-down during such heating operation; and subsequently subjecting said briquets to the usual zinc-distillation process to recover the zinc.

6. The method of forming briquets of zinc-bearing ore for distillation purposes, consisting in grinding and calcining the ore, mixing it with pulverized coke in quantity more than sufficient for the reduction of metallic oxids in the ore and with a carbonaceous binding material, forming said mixture into briquets under pressure, and heating said briquets to a temperature sufficiently high to destructively distil and coke the carbonaceous binding material, but not high enough to volatilize the zinc-content of the ore, to form a briquet capable of withstanding without disintegration the usual zinc-distillation process.

7. The method of forming briquets of zinc-bearing ore for distillation purposes, consisting in grinding and calcining the ore, mixing it with pulverized coke in quantity more than sufficient for the reduction of metallic oxids in the ore and with a carbonaceous binding material, forming said mixture into briquets under pressure, and heating said briquets while supported against collapse to a temperature sufficiently high to destructively distil and coke the carbonaceous binding material, but not high enough to volatilize the zinc-content of the ore, to form a briquet capable of withstanding without disintegration the usual zinc-distillation process.

8. The method of forming briquets of zinc-bearing ore for distillation purposes, consisting in grinding and calcining the ore, mixing it with pulverized coke in quantity more than sufficient for the reduction of metallic oxids in the ore and with pitch and tar, forming said mixture into briquets under pressure, and heating said briquets while supported against collapse to a temperature sufficiently high to destructively distil and coke the pitch and tar, but not high enough to volatilize the zinc-content of the ore, to form a briquet capable of withstanding without disintegration the usual zinc-distillation process.

9. The method of forming briquets of zinc-bearing ore for distillation purposes, consisting in grinding and calcining the ore, mixing it with pulverized coke and a carbonaceous binder such as pitch or tar, the quantity of coke being such as to furnish the necessary carbon for reduction of all the metallic oxids in the ore, plus such an additional amount of coke that the weight of the briquet, after distillation, will not be less than forty to fifty per cent. of the weight of the briquet before distillation; briqueting the mixture under pressure in molds, and heating the briquets to a temperature high enough to destructively distil and coke the carbonaceous binder without volatilizing the zinc-content of the ore.

10. The method of forming briquets of zinc-bearing ore for distillation purposes, consisting in grinding and calcining the ore, mixing it with pulverized coke and a carbonaceous binder such as pitch and tar, the quantity of coke being such as to furnish the necessary carbon for reduction of all the metallic oxids in the ore, plus such an additional amount of coke that the weight of the briquet, after distillation, will not be less than forty to fifty per cent. of the weight of the briquet before distillation, and the quantity of binder being from twelve to fifteen per cent. of the combined weight of the ore and the coke; briqueting the mixture under pressure in molds, heating the briquets to a temperature high enough to destructively distil and coke the carbonaceous binder without volatilizing the zinc-content of the ore, and supporting the briquets against collapse or breaking-down during such heating operation.

11. The hereindescribed zinc ore briquet, consisting of calcined ore particles embedded in a compacted coke matrix, said matrix being composed of particles of finely-divided coke and the coked residue of a carbonaceous binder such as pitch or tar, such 1,193,680

12. The hereindescribed zinc ore briquet, consisting of calcined ore particles embedded in a coke matrix, said matrix being composed of particles of finely-divided coke and the coked residue of a carbonaceous binder such as pitch or tar, the coke being in quantity more than sufficient for the reduction of metallic oxids in the ore, such briquets being capable of maintaining both their form and volume during distillation of the zinc.

13. The hereindescribed zinc ore briquet, consisting of calcined ore particles embedded in a coke matrix, said matrix being composed of particles of finely-divided coke and the coked residue of a carbonaceous binder such as pitch or tar, the coke being in quantity sufficient to furnish the necessary carbon for reduction of all the metallic oxids in the ore plus such an additional amount of coke that the weight of the briquet, after distillation, will not be less than forty to fifty per cent. of the weight of the briquet before distillation.

14. The hereindescribed zinc ore briquet, consisting of calcined ore particles embedded in a coke matrix, said matrix being composed of particles of finely-divided coke and the coked residue of a carbonaceous binder such as pitch or tar, such briquets being produced by commingling calcined zinc ore with pulverized coke and a carbonaceous binder, forming the mixture into briquets under pressure and thereafter heating the briquets to a temperature sufficiently high to destructively distil and coke the binding material without volatilizing the zinc-content of the ore, such briquets being capable of maintaining both their form and volume during distillation of the zinc.

CHARLES H. FULTON.

Witnesses:
W. R. DELANEY,
CHAS. J. PECHA.